US012172817B2

(12) United States Patent
Chaturvedi

(10) Patent No.: US 12,172,817 B2
(45) Date of Patent: Dec. 24, 2024

(54) POUCH HAVING TRANSPARENT WINDOW WITH ANTI-COUNTERFEITING FEATURE

(71) Applicant: Ashok Chaturvedi, New Delhi (IN)

(72) Inventor: Ashok Chaturvedi, New Delhi (IN)

( * ) Notice: Subject to any disclaimer, the term of this patent is extended or adjusted under 35 U.S.C. 154(b) by 319 days.

(21) Appl. No.: 17/610,274

(22) PCT Filed: May 9, 2020

(86) PCT No.: PCT/IN2020/050420
§ 371 (c)(1),
(2) Date: Nov. 10, 2021

(87) PCT Pub. No.: WO2020/230155
PCT Pub. Date: Nov. 19, 2020

(65) Prior Publication Data

US 2022/0363464 A1 Nov. 17, 2022

(30) Foreign Application Priority Data

May 11, 2019 (IN) ............................ 201911018899

(51) Int. Cl.

| | |
|---|---|
| ***B65D 75/54*** | (2006.01) |
| ***B65D 75/12*** | (2006.01) |
| ***B65D 75/52*** | (2006.01) |
| *B42D 25/328* | (2014.01) |
| *B42D 25/351* | (2014.01) |
| *B42D 25/373* | (2014.01) |

(52) U.S. Cl.
CPC ............ *B65D 75/54* (2013.01); *B65D 75/12* (2013.01); *B65D 75/522* (2013.01);
(Continued)

(58) Field of Classification Search
CPC ...... B65D 75/54; B65D 75/12; B65D 75/522; B65D 2203/12; B42D 25/328; B42D 25/351; B42D 25/373
(Continued)

(56) References Cited

U.S. PATENT DOCUMENTS 4,998,666 A * 3/1991 Ewan .................. B65D 55/026 229/162.1
5,060,848 A * 10/1991 Ewan ..................... B65D 33/34 229/162.1
(Continued)

FOREIGN PATENT DOCUMENTS

CN 201923519 U 8/2011
CN 201942080 U 8/2011
(Continued)

OTHER PUBLICATIONS

Office Action dated Nov. 17, 2022, pertaining to CA Patent Application No. 3,140,135, 3 pgs.
(Continued)

*Primary Examiner* — Jes F Pascua
(74) *Attorney, Agent, or Firm* — Dinsmore & Shohl LLP

(57) ABSTRACT

The present invention relates to a flexible package for providing security against counterfeiting. The flexible package includes a plurality of panels made of a flexible polymeric substrate, which further includes a front panel, a rear panel arranged in opposite to the front panel defining an interior space of the package and at least one longitudinal narrow window portion on at least one panel. A transparent or translucent polymeric security strip is having a clear high barrier coating, is sealed over the window portion towards inner side of the panel overlapping the edges of the window portion but not overlapping the entire panel, a security feature is provided on the strip on at least one of its surface at a predefined location or random places or all over the strip surface for securing the package against counterfeiting.

17 Claims, 9 Drawing Sheets

(52) U.S. Cl.
CPC .......... *B42D 25/328* (2014.10); *B42D 25/351* (2014.10); *B42D 25/373* (2014.10); *B65D 2203/12* (2013.01)

(58) Field of Classification Search
USPC .............................................................. 383/5
See application file for complete search history.

(56) References Cited

U.S. PATENT DOCUMENTS

2008/0239513 A1 * 10/2008 Karszes ................. G02B 3/005 359/741
2009/0272805 A1 * 11/2009 Riddle ................. G03H 1/0011 235/487
2018/0257323 A1 * 9/2018 Chaturvedi ............... C08C 1/04

FOREIGN PATENT DOCUMENTS

EP 1331839 A1 * 7/2003 ............. B32B 27/00
EP 2331424 B1 * 12/2018 ............. B32B 27/06

OTHER PUBLICATIONS

International Search report mailed Sep. 21, 2020 in reference to Indian Patent Application No. PCT/IN2020/050420 filed May 9, 2020.

* cited by examiner

POUCH HAVING TRANSPARENT WINDOW WITH ANTI-COUNTERFEITING FEATURE

FIELD OF THE INVENTION

The present invention relates, in general, to a flexible package having anti-counterfeiting features. More particularly, the present invention relates to a flexible package having a plurality of panels and at least one security strip on at least one panel, provided with the security features for securing the package against the counterfeiting, without or with visibility of product inside the package.

BACKGROUND OF THE INVENTION

The sale of counterfeit products is an ever-increasing problem, nowadays. Such counterfeit products are frequently packaged so that they resemble the genuine products as closely as possible with a view to mislead the purchaser into believing that genuine products are being bought. This causes concern to the manufacturer of the genuine products. More importantly, however, the counterfeit product soften of inferior quality to the genuine product and thus their sale can seriously damage the reputation of the manufacturer of the genuine product and the consumers, in future, will be less inclined to purchase even the genuine goods.

Further, in the case where the counterfeit products are, for example, products packed in flexible or rigid packages, they may not meet the quality control standards of the manufacturer of the original products and may thus constitute a risk to the safety of the user.

Various other features for example a transparent window to see the product inside the package and to have a real view of the product in order to attract the customer, create trust of quality, are preferred by customers in addition to anti-counterfeiting features to gain customer attention.

Several arts teach the incorporation of window in the flexible packages. and one of those has been discussed below:

CN201923519U discloses a carton beverage package, which mainly comprises a closed container formed by a composite packaging material, and a transparent window is arranged on one side surface of the beverage box package. The carton beverage package has necessary quality requirements of an ordinary carton package, can also allow consumers to see the appearance and shape of beverage, so the right to know of consumers is guaranteed, unscrupulous businessmen are prevented from taking substandard products as fine product, the consumers are prevented from mistakenly drinking expired bad beverages (especially deposited dairy products caused by deterioration), and beverage makers are supervised to a certain extent.

The aforesaid document however provides a package with window to view the contents of the package but disadvantage with such window pouch is that the low barrier properties the window film of PE than that of the panel, shelf life of the product is compromised. Non-availability of any security feature against the counterfeiting may lead the user to purchase the spurious products.

A large variety of products such as snack foods, seeds, ready to fry products, juices, oils etc. are packaged in pillow packs, generally made on vertical form, fill & seal machines. Such packages have centre sealing overlapping the two layers of the film/laminate in the vertical direction forming a tube. While cross sealing the tube to separate filled pouches the sealing jaws need to press two layers in most of the width of the pouch but middle portion has four layers (in region ‘p’ as shown in FIG. 4*b*) of the packaging substrate during the heat sealing. This sometimes causes poor sealing in four layered region between the sealing jaws. The poor sealing may compromise package integrity and also cause leakages particularly in the case of liquid products.

Accordingly, there is a need of a flexible package having a strip with security feature(s) against the counterfeiting which offers stringent security feature(s) on it to secure the package against counterfeiting, which requires more technological innovation and special processes and equipment and which can be manufactured with stronger sealing strength, making the features less prone to counterfeiting yet keeping the packaging economical, attractive and effective enough.

SUMMARY OF THE PRESENT INVENTION

The present invention describes a flexible package having stringent features to provide security against counterfeiting. The package includes a front panel and a rear panel arranged in opposite to the front panel defining an interior space of the package, and at least one longitudinal continuous polymeric security strip on at least one panel. The security strip may be opaque, transparent or translucent.

The polymeric security strip has a high barrier structure, heat sealed on the inner surface of the panel edges overlapping the strip edges (as shown in FIG. 2). The strip can also be sealed over the outer surface of the package film/laminate (as shown in FIG. 2*a*). The security feature(s) are provided visible from the exterior surface of the strip, if the strip is opaque, at a predefined location or random places or all over the strip surface for securing the package against the counterfeiting. In case of transparent or translucent strip, the security features can also be provided on the interior surface, configured between the layers of the strip laminate or exterior of the strip or in any combination thereof.

BRIEF DESCRIPTION OF THE DRAWINGS

The advantages and features of the present invention shall be better understood with reference to the following detailed description taken in conjunction with the accompanying drawings, wherein like elements are identified with like symbols and in which.

Like reference numerals refer to like parts throughout the description of several views of the drawings.

DETAILED DESCRIPTION OF THE PRESENT INVENTION

Description of the Invention for a thorough understanding of the present invention, reference is made to the following detailed description in connection with the abovementioned drawings. Although the present invention is described with reference to exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the present invention. Further, it will nevertheless be understood that no limitation in the scope of the invention is thereby intended, such alterations and further modifications in the figures and such further applications of the principles of the invention as illustrated herein being contemplated as would normally occur to one skilled in the art to which the invention relates. Also, it is to be understood that the phraseology and terminology used herein is for the purpose of description and should not be regarded as limiting. Further, reference herein to "one embodiment" or "an embodiment" means that a particular feature, characteristic, or function described in connection with the embodiment is included in at least one embodiment of the invention. Furthermore, the appearances of such phrase at various places herein are not necessarily all referring to the same embodiment. The terms "a" and "an" herein do not denote a limitation of quantity, but rather denote the presence of at least one of the referenced item.

The present invention relates to a flexible package having features to provide security against counterfeiting offering improved sealing. In various exemplary embodiments, the flexible package can be used for packing food items such as, but not limited to, liquid, milk, oil, juice, milk powder, snacks, cookies, and the like food products, although the package can also be used for non-food items, according to the requirement of the customer. The flexible package of the present disclosure is described hereinafter in conjunction with FIGS. 1, 2, and 3.

Figure 1:
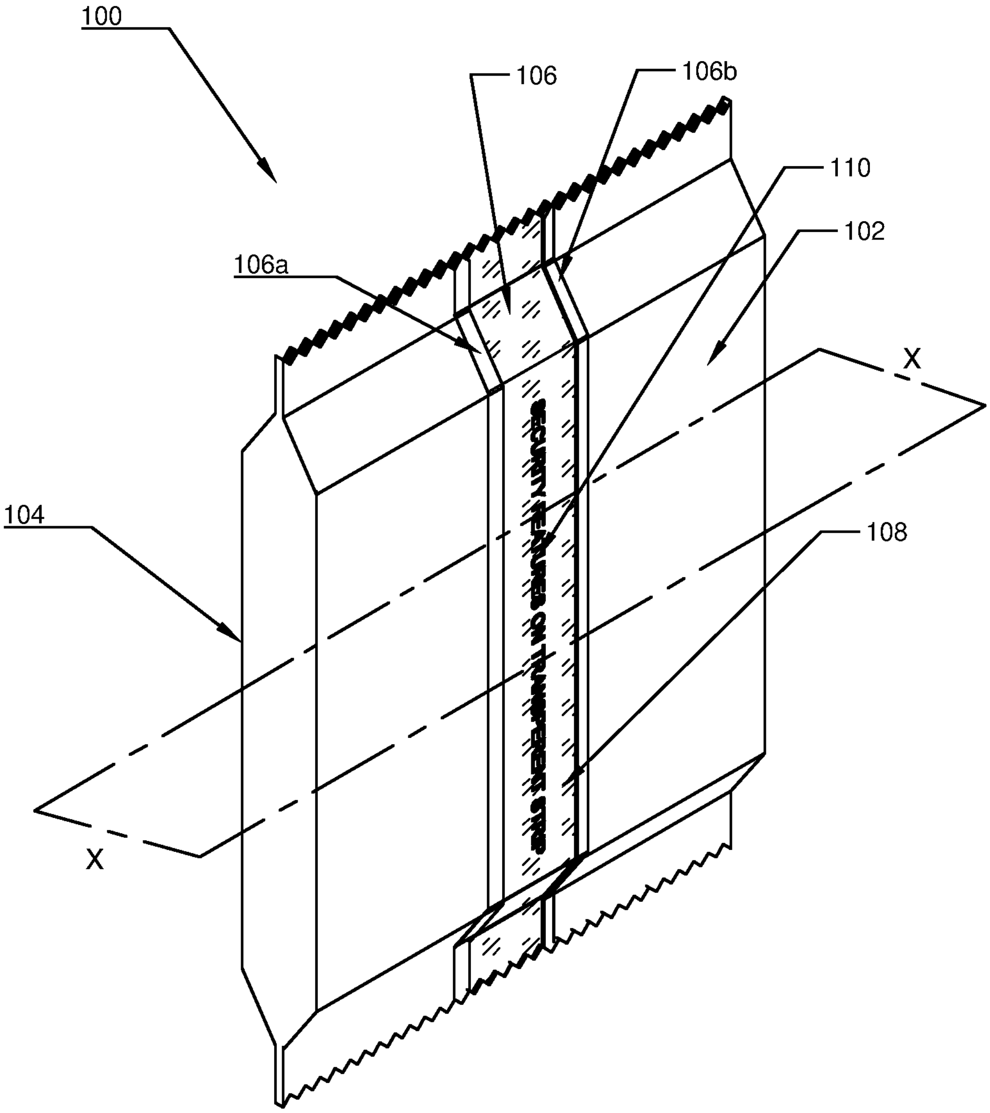
FIG. 1 illustrates an exemplary flexible package, according to an embodiment of the present invention.

As depicted in FIG. 1, the flexible package (100) includes a front panel (102), a rear panel (104) and a longitudinal security strip portion (108) on the front panel (102), defining an interior space of the flexible package (100). A polymeric security strip (106) having high barrier (304 of FIG. 3) is sealed on the inner/outer surface of the panel (102) over the strip portion (108) overlapping the edges (106*a*, 106*b*) of the panel (102) but not overlapping the entire panel (102). The plurality of panels made of a flexible substrate, which can be opaque, transparent, semi-transparent or translucent substrate, according to the need of the producer. A security feature (110) is provided on at least one surface of the security strip (106) at a predefined location or random places or all over the strip surface for securing the package against counterfeiting. The security strip (106) can be opaque, transparent, semi-transparent or translucent based on the requirement or the product to be packaged. A coat of metallization of barrier material and/or an additional layer of barrier material is applied on the polymeric security strip (106) to impart barrier to the security strip to match the barrier properties of the strip (106) with that of rest of the package surfaces.

According to an exemplary embodiment, the flexible package other than the security strip portion is made of flexible substrates such as single or multilayer polymeric film or a laminate with/without a metal foil/metallization, and a fibrous substrate or combination thereof. The fibrous substrate can be at least one of a natural fibre substrate like paper (coated or uncoated), paperboard, non-woven, woven substrate of synthetic fibres. The single or multilayer polymeric films can be at least one or in combinations with Polyethylene (PE), Polyethylene Terephthalate (PET) film, Biaxially-Oriented Polypropylene (BOPP) film, Polyvinyl Chloride (PVC) film, Poly Carbonate (PC), Cast Polypropylene (CPP) film, Mylar, Nylon (PA), and Ethylene Vinyl Acetate or any other polymer or Bio degradable polymer.

The metal foil can be at least one of Aluminium, Copper, Silver, any other metal or metal alloy or metalized layer of Aluminium, Aluminium Oxide, zinc sulphide, Silicon Oxide, Silver, Gold, Copper, Chrome, silicon monoxide, silicon dioxide, magnesium fluoride, titanium dioxide, tin tungsten oxide and indium tin oxide or any other suitable metal.

The substrate can be surface or reverse printed. The printed content (not shown) may be in the form of logo, trademark, picture, graphics or text or any other information as desired. The printed content may be one of text/images printed with ink, hot foil printed/stamped text/images. The substrate may also be surface treated with corona or any other suitable method or coated to increase surface energy or untreated as per the requirement of the manufacturing processes.

Although FIG. 1 depicts only a single polymeric security strip (106) having the security feature(s) (110); the shape, number, position and size of the security strip (106) in the package and the security feature(s) (110) on the strip (106) can vary as per the requirement, without deviating from the scope of the present disclosure. The structure of the flexible package and the security strip are described in details in conjunction with FIGS. 2 and 3.

Figure 2:
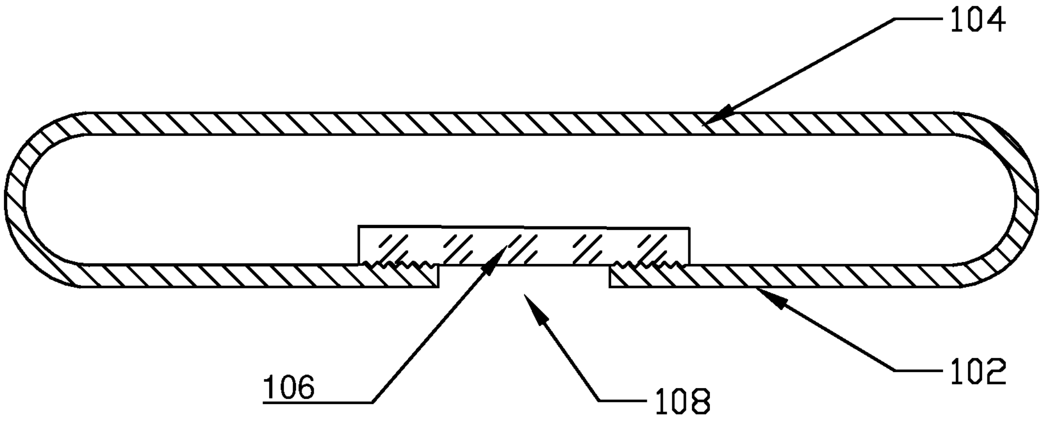
FIGS. 2& 2*a* illustrate section views of the package depicting the polymeric security strip film sealed with the inner and outer surface of a panel of the flexible package, according to an embodiment of the present invention.
Figure 2A:
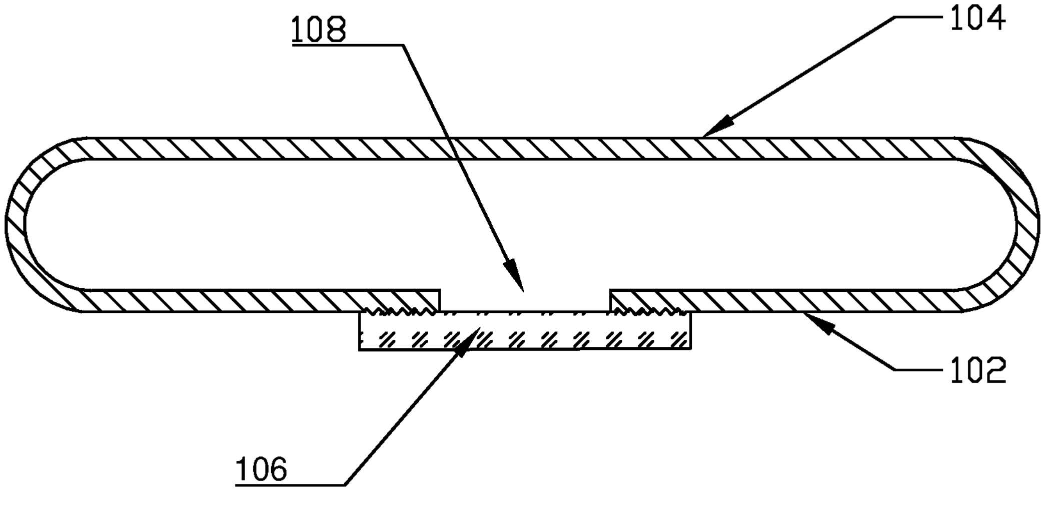

FIG. 2 depicts sectional view of package across the plane x-x depicted in FIG. 1. As shown, the security strip (106) is sealed over the strip portion (108) on the inner surface of the panel (102) of the package (100). The width of the security strip (106) shall be more than that of the security strip portion (108). The width of the strip (106) is taken so as to cover the security strip portion (108) overlapping (106*a*, 106*b*) the edges of the panel (102). According to another embodiment, the security strip (106) can also be sealed on the outer surface of the panel (102), as shown in FIG. 2*a*.

The security strip (106) may be made of flexible substrates such as single or multilayer polymeric film or a laminate with/without a metal foil/metallization, and a fibrous substrate or combination thereof. The security strip (106) may be opaque, transparent or translucent based on the requirement or product to be packaged. The opaque polymeric security strip (106) is one of polymeric monolayer or multilayer film or laminate, foil, paper, woven or non-woven fibrous substrate or a combination thereof, printed or unprinted says for example, the fibrous substrate can be at least one of a natural fibre substrate like paper (coated or uncoated), paperboard, non-woven, woven substrate of synthetic fibres.

The single or multilayer polymeric films can be at least one or in combinations with Polyethylene (PE), Biaxially-Oriented Polyethylene Terephthalate (BOPET) film, Biaxially-Oriented Polypropylene (BOPP) film, Polyvinyl Chloride (PVC) film, Poly Carbonate (PC), Cast Polypropylene (CPP) film, Mylar, Nylon (PA), and Ethylene Vinyl Acetate or any other polymer or Bio degradable polymer.

The metal foil can be at least one of Aluminium, Copper, Silver, any other metal or metal alloy or metalized layer of Aluminium, Aluminium Oxide, zinc sulphide, Silicon Oxide, Silver, Gold, Copper, Chrome, silicon monoxide, silicon dioxide, magnesium fluoride, titanium dioxide, tin tungsten oxide and indium tin oxide or any other suitable metal.

In case of transparent security strip (106), the security strip (106) can be a polymeric monolayer or multilayer film/laminate having layer(s) of polymeric materials such as, but not limited to, at least one of Polyethylene (PE), Biaxially-Oriented Polyethylene Terephthalate (BOPET) film, Biaxially-Oriented Polypropylene (BOPP) film, Polyvinyl Chloride (PVC) film, Poly Carbonate (PC), Cast Polypropylene (CPP) film, Nylon (PA), EVOH and Ethylene Vinyl Acetate or any other polymer or Bio degradable polymer or a combination thereof.

It should be appreciated that in case of transparent security strip (106), a clear barrier coating of metal oxide or Sulphide materials on one or both surfaces of the transparent polymeric strip (106) or on at least one layer of multilayer laminate, is applied. Vacuum metallization is one of methods of applying barrier coatings using but not limited to, Aluminium Oxide or silicon oxide or Zinc Sulphide or any other metal compound offering transparent layer or combination thereof. Another type of solvent based or aqueous liquid coatings such as PVdC, EVOH, EAA, or Acrylics may be applied by rotogravure or flexographic printing or spray coating or any other suitable method. Another type of barrier coating such as Plasma enhanced chemical vapor deposition (PECVD) may also be used.

The security features (110) incorporated on the polymeric security strip (106) is at least one of a hologram, 3-dimensional patterns, latent image(s), optical patterns, Fresnel lenses, sterling lenses, or a combination thereof. The security feature can be covert or overt. The covert security feature requires certain filter, UV light, sensor or equipment to view the security features while overt security features are visible without any aid. The security feature (110) can be incorporated on the security strip (106) registered or unregistered using suitable methods known in the art such as hard embossing, soft embossing or cast & cure using UV or e-beam curing or hot stamping.

Figure 3:
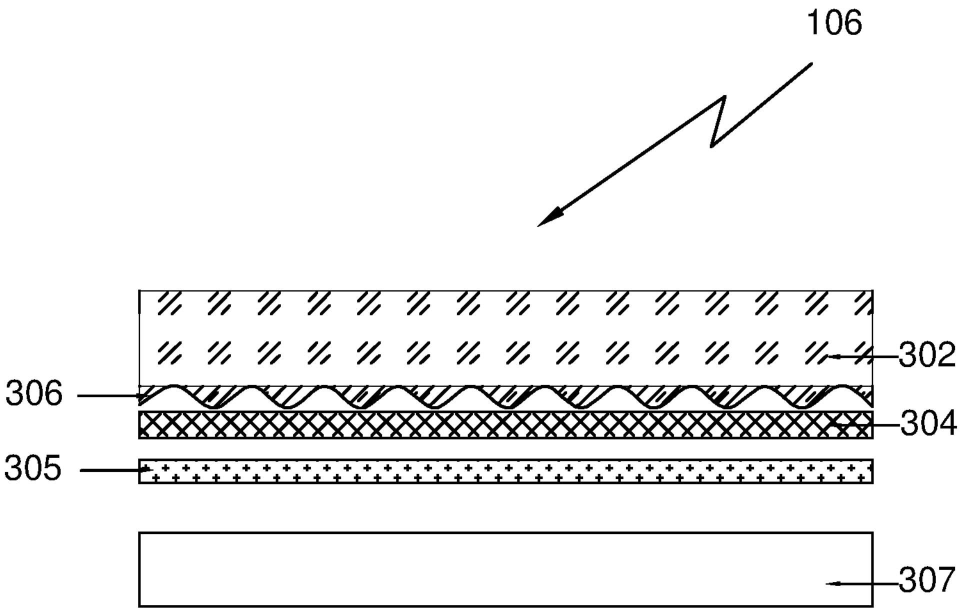
FIGS. 3 and 3*a*-3*g* illustrate different structure of the polymeric security strip film having the barrier coating and security feature(s), according to an embodiment of the present invention.

FIGS. 3 and 3*a*-3*g* depict various exemplary embodiments of the structure of security strip (106) of the present invention however other combinations known in the art can also be used without deviating from the scope of the present invention. As depicted in FIG. 3, the security strip (106) is a transparent strip having barrier coating (304) and security features (306) both on the same surface (302*b*) of a strip substrate (302). The transparent security strip (106) further includes a sealing layer (307) of suitable polymeric heat sealable material configured with the barrier coating (304) using an adhesive (305). The sealing layer (307) may also be a heat seal lacquer directly configured with the barrier coating.

Figure 3A:
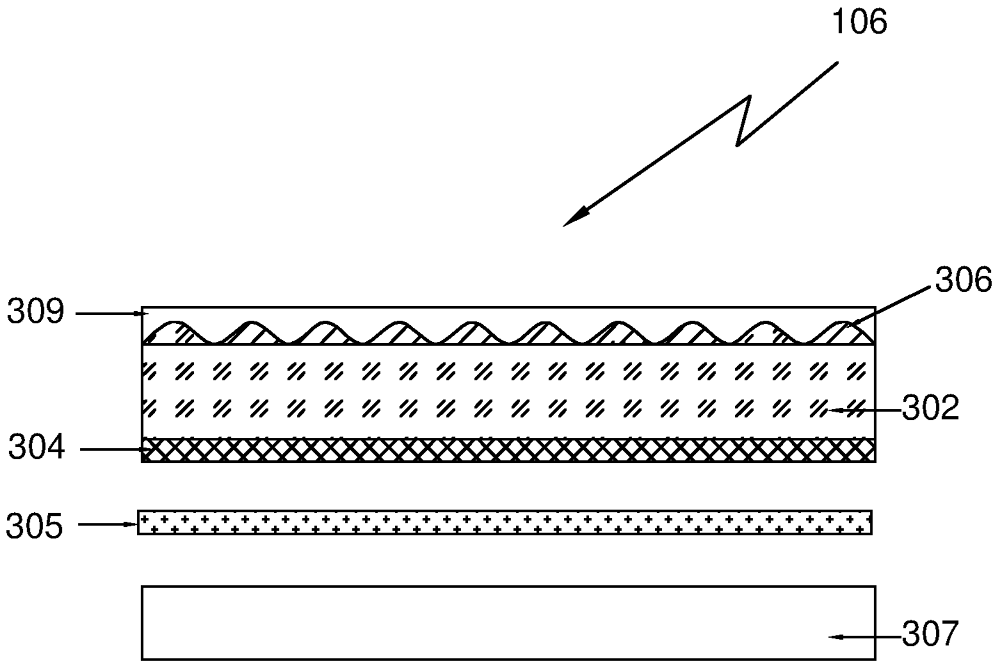

In an alternate embodiment as depicted in FIG. 3*a*, the security strip (106) is an opaque strip having a barrier coating (304) on one surface (302*b*) of a strip substrate (302) and the security features (306) on other surface (302*a*) of the strip substrate (302). The security strip (106) further includes a sealing layer (307) of suitable polymeric heat sealable material configured with the barrier coating (304) using an adhesive (305). The example of polymeric heat sealable material is, but not limited to, PE. A clear lacquer coating (309) is provided over the security features (306) to provide abrasion protection to the security features (306). The clear coating can be applied by rotogravure or flexographic printing or spray coating or any other suitable method known in the art. In case of transparent security strip (106), surface or reverse printing may be provided to include key information related to the product or package.

Similarly the transparent security strip (106) may have following layer structures without deviating from the scope of the present disclosure.

Figure 3B:
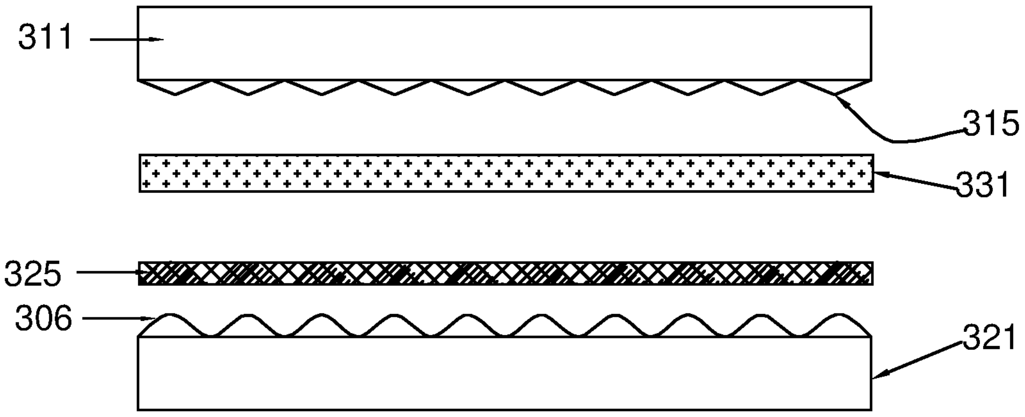

As shown in FIG. 3*b:*

BOPET|BOPP (311)/Optional reverse printing (315)/Adhesive (331)/Metallization (325) over embossed security feature (327)/PE (321).

Figure 3C:
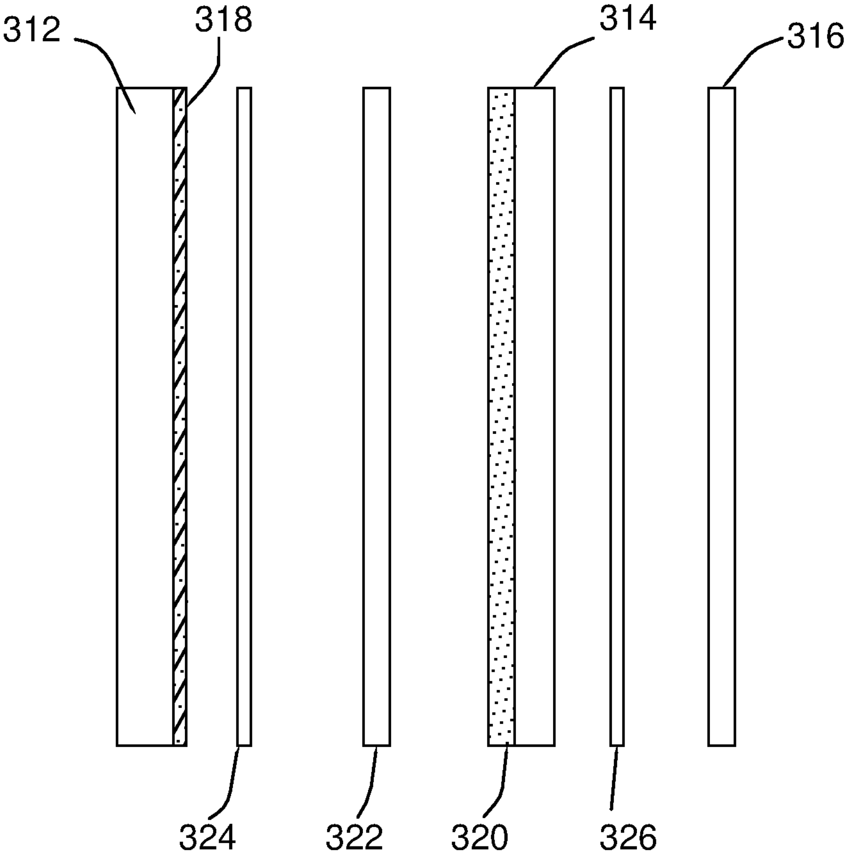

As shown in FIG. 3*c:*

BOPET|BOPP (312)/Optional reverse printing (318)/adhesive (324)/Metallization (322) over Security feature (320)/BOPET (314)/Adhesive (326)/PE (316).

Figure 3D:
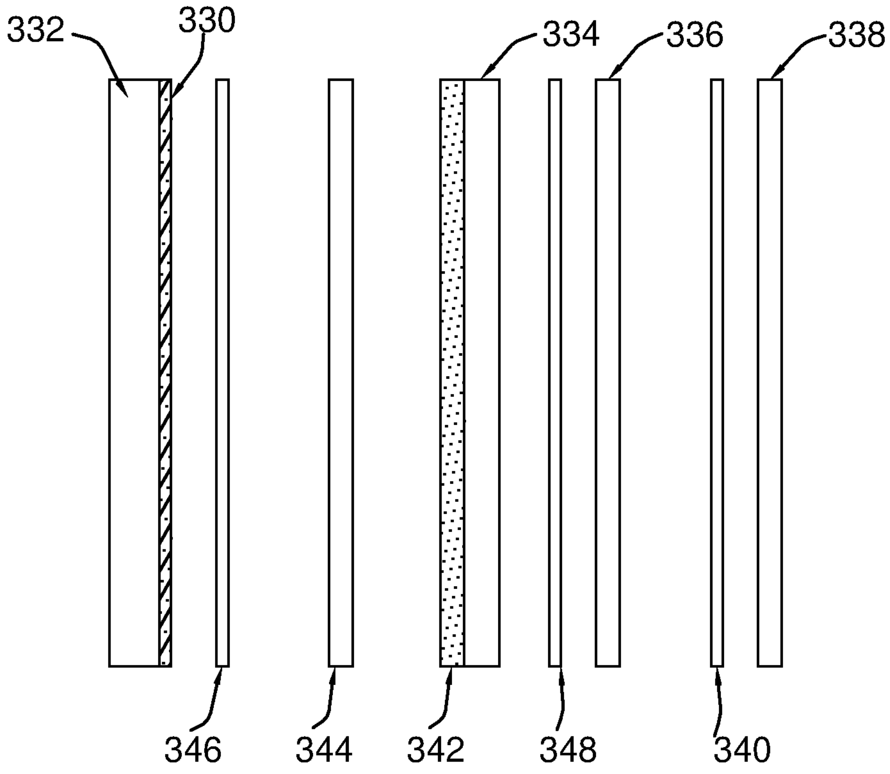

As shown in FIG. 3*d:*

BOPET|BOPP (332)/Optional reverse printing (330)/adhesive (346)/Metallization (344) over Security features (342)/BOPET|BOPP (334)/Adhesive (348)/Barrier layer (336) such as EVOH/Adhesive (340)/PE (338).

Figure 3E:
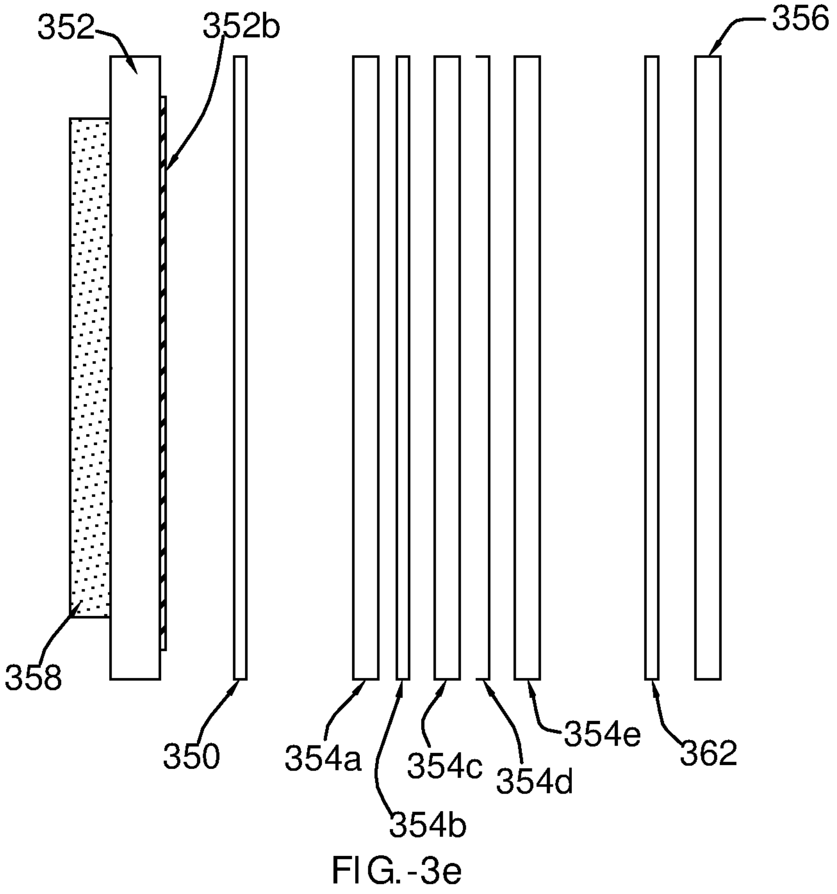

As shown in FIG. 3*e:*

Registered security feature such as hologram, Fresnel lens, latent image or any other optical pattern configured by hot foil stamping (358)/BOPET (352)/Optional Reverse printing (352*b*)/Adhesive (350)/PE (354*a*)/Tie layer (354*b*)/EVOH (354*c*)/Tie layer (354*d*)/PE (354*e*)/Adhesive (362)/PE (356).

Figure 3F:
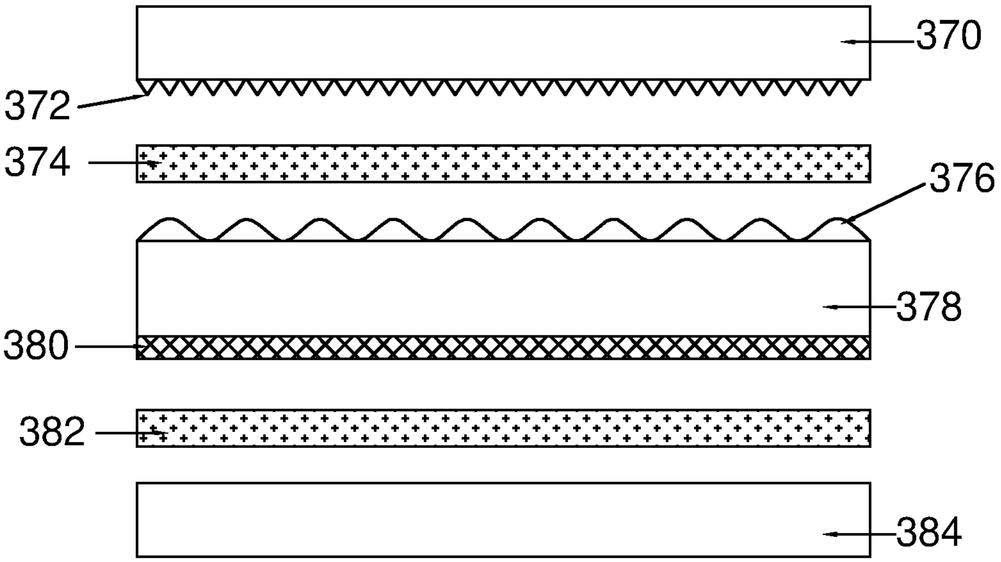

As shown in FIG. 3*f:*

BOPET|BOPP (370)/Optional Reverse printing (372)/Adhesive (374)/Security features (376)/BOPET|BOPP (378)/Metallization (380)/adhesive (382)/PE (384).

Figure 3G:
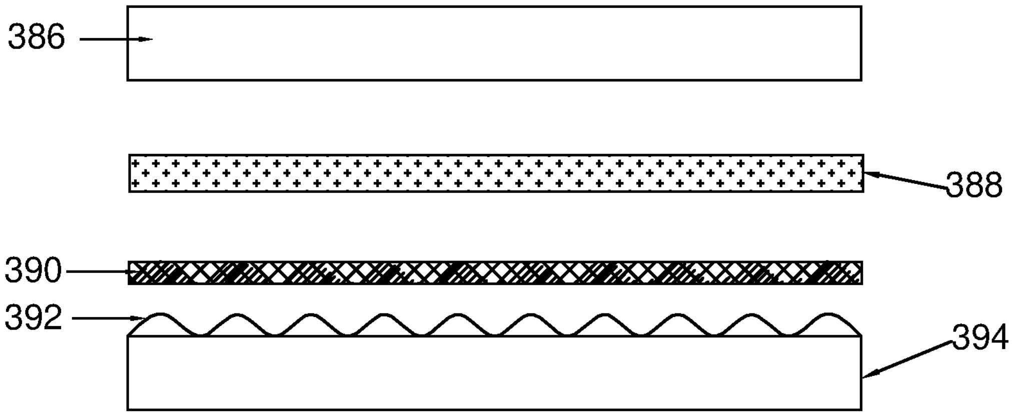

As shown in FIG. 3*g:*

PE (386)/Adhesive (388)/Metallization (390) overSecurity features (392)/BOPET/BOPP (394)

The barrier coating or the metallization can be done by any suitable method known in the art. As described hereinbefore, an example of such method of barrier coating (304) is, but not limited to, vacuum metallization or PECVD which may be applied by rotogravure or flexographic printing or spray coating or any other suitable method. Similarly the security features (306) can be incorporated on the security strip (106) using any suitable method known in the art. The security features (306, 327, 320, 342, 358, 376, and 392) can be configured using suitable processes such as, but not limited to, soft embossing, hard embossing, cast & cure and hot foil stamping etc. Various layers in the above described structure such as Reverse printing, Adhesive, Tie layer, EVOH, and BOPP/OPP are known in the art and hence further details of these layers have been precluded from this disclosure for the sake of brevity.

Figure 4A:
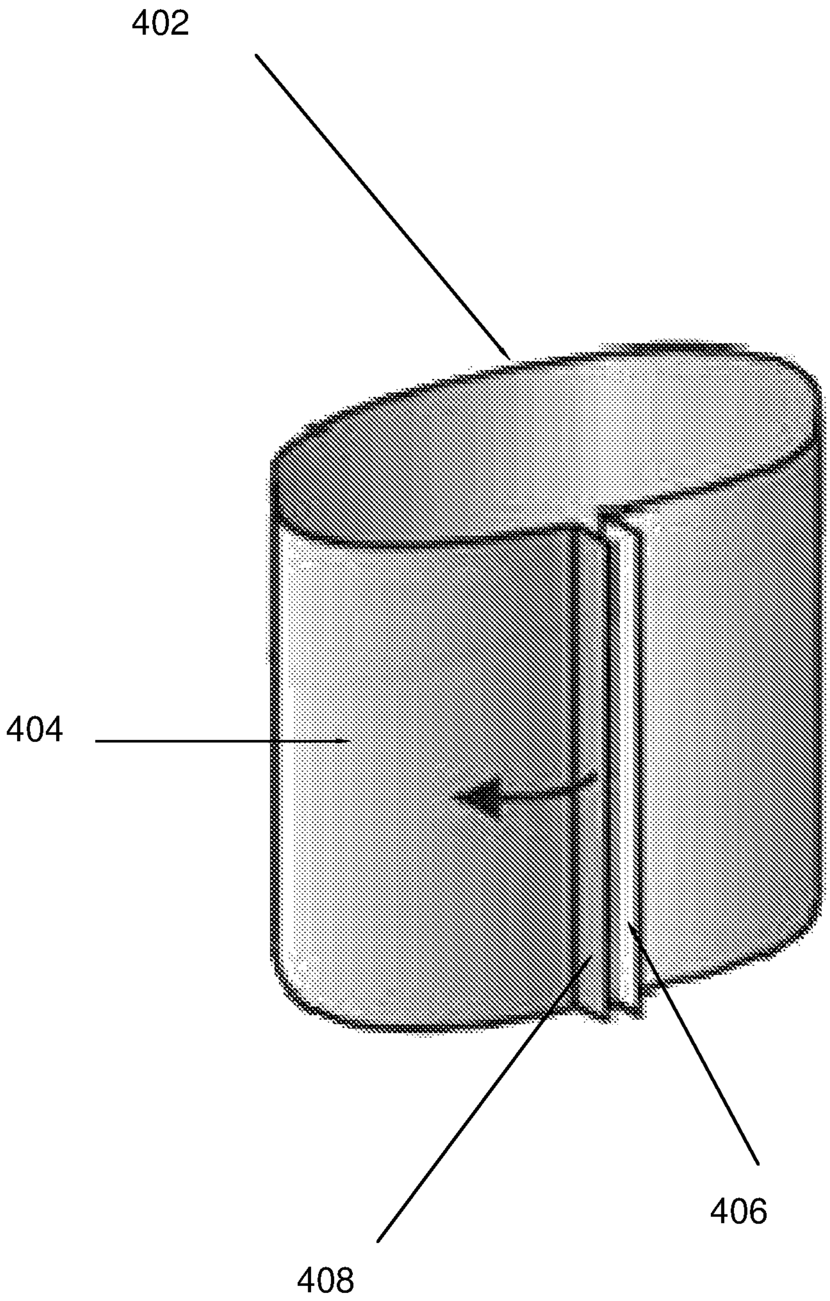
FIGS. 4, 4*a* and 4*b* illustrate a flexible package of prior art depicting four layers during cross sealing.
Figure 4B:
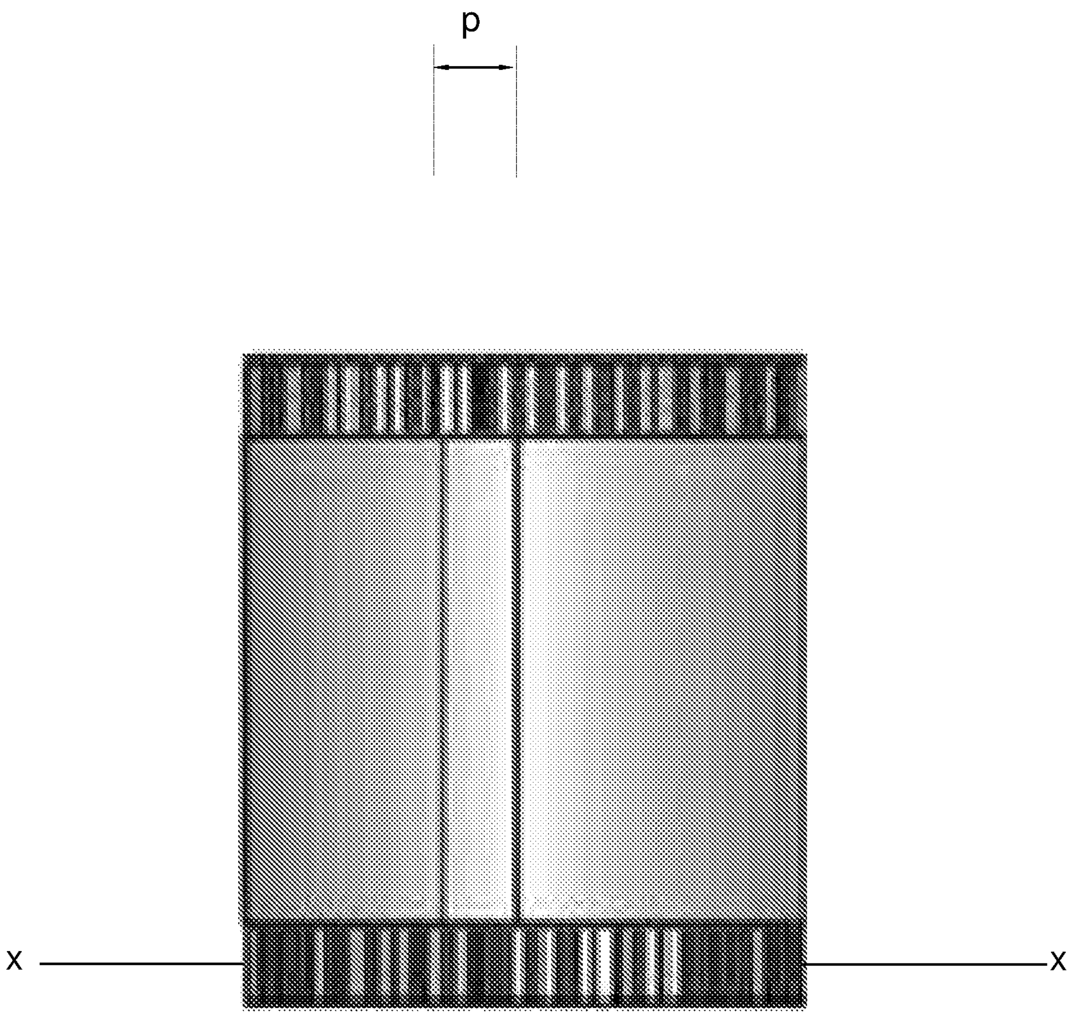
Figure 4C:
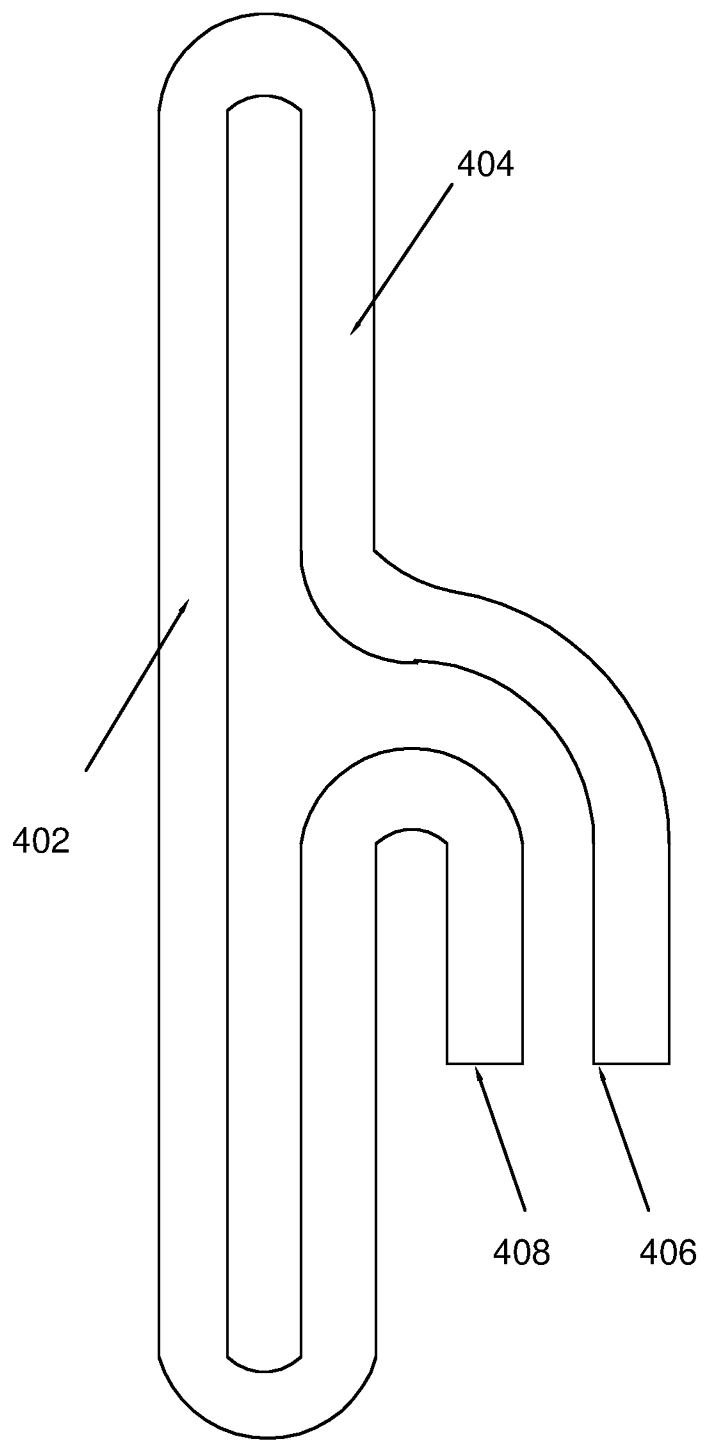

As described in the background section and as shown in FIG. 4, there are four layers (402, 404, 406 and 408) at the middle in the region 'p' during cross heat sealing which may cause poor sealing whereas in the present invention there are only three layers (102, 104, and 106) during the cross heat sealing where the strip (106) is overlapping the panel (102), as depicted in FIGS. 2 and 2*a*. Because of lesser number of layers at the middle during cross sealing, the quality of sealing and time taken in the cross sealing both are improved.

It should be appreciated that the security features may also include information, such as, but not limited to, packed products details, manufacturing date, expiry date, batch number and or any other desired information, for facilitating the consumers to identify desired product in the market.

Similarly the flexible package (100) can be manufactured using any suitable method using suitable machine known in the art. Examples of such machines include, but not limited to, single or double or multi-track Vertical Form-Fill-Seal machine. The description of such machines and method of manufacturing of the package is not provided herein for the sake of brevity.

The foregoing descriptions of specific exemplary embodiments of the present invention have been presented for purposes of illustration and description only. They are not intended to be exhaustive or to limit the invention to the precise forms and sequence of steps disclosed, and obviously many modifications and variations are possible in light of the above teachings. The exemplary embodiments were chosen and described in order to explain certain principles of the invention and their practical application, thereby enabling others skilled in the art to make and utilize various exemplary embodiments of the present invention, as well as various alternatives and modifications thereof.

I claim:

1. A flexible package having security against counterfeiting, the flexible package comprising:

a plurality of panels each made of a flexible substrate, the plurality of panels comprising at least:

a front panel; and a rear panel arranged opposite to the front panel, the front panel and the rear panel defining an interior space of the package;

at least one polymeric security strip having a barrier coating; and a hologram configured on at least one surface of the at least one polymeric security strip, wherein the at least one polymeric security strip is sealed to an inner surface or an outer surface of at least one panel, overlapping edges of the at least one panel but not overlapping the entire at least one panel, forming a three-layer structure where the at least one polymeric security strip overlaps the edges of the at least one panel.

2. The flexible package of claim 1, wherein the flexible substrate is an opaque substrate, a transparent substrate, or a translucent substrate.

3. The flexible package of claim 1, wherein the flexible substrate is a polymeric monolayer, a polymeric multilayer film, a polymeric laminate, foil, paper, a woven or non-woven fibrous substrate, or a combination thereof.

4. The flexible package as claimed in claim 1, wherein the at least one polymeric security strip comprises an opaque polymeric substrate, a transparent polymeric substrate, or a translucent polymeric substrate.

5. The flexible package of claim 4, wherein the transparent polymeric substrate or the translucent polymeric substrate is polyethylene (PE), polyethylene terephthalate (PET) film, biaxially-oriented polypropylene (BOPP) film, polyvinyl chloride (PVC) film, poly carbonate (PC), cast polypropylene (CPP) film, biaxially-oriented polyethylene terephthalate (BOPET) film, nylon (PA), ethylene vinyl acetate, any Bio degradable polymer, or a combination thereof.

6. The flexible package of claim 1, wherein the at least one polymeric security strip is a polymeric monolayer, a polymeric multilayer film, a polymeric laminate, foil, paper, a woven or non-woven fibrous substrate, or a combination thereof.

7. The flexible package of claim 1, wherein the barrier coating is PVdC, EVOH, EAA, acrylics, aluminum oxide, silicon oxide, zinc sulfide, or a combination thereof.

8. The flexible package of claim 1, wherein the at least one polymeric security strip comprises a transparent polymeric substrate, and wherein the barrier coating is aluminum oxide, silicon oxide, zinc sulfide, or a combination thereof.

9. The flexible package of claim 1, wherein the at least one polymeric security strip comprises an opaque polymeric substrate, and wherein the barrier coating is PVdC, EVOH, EAA, acrylics, aluminum oxide, silicon oxide, zinc sulfide, or a combination thereof.

10. The flexible package of claim 1, wherein the hologram is configured at a predefined location on the at least one surface of the at least one polymeric security strip.

11. The flexible package of claim 1, wherein the hologram is configured at random places on the at least one surface of the at least one polymeric security strip.

12. The flexible package of claim 1, wherein the hologram is configured all over the at least one surface of the at least one polymeric security strip.

13. The flexible package of claim 1, wherein the at least one polymeric security strip is sealed to the outer surface of the at least one panel.

14. The flexible package of claim 1, wherein the barrier coating is a solvent-based barrier coating comprising polyvinylidene chloride (PVdC), ethylene vinyl alcohol (EVOH), or an acrylic material.

15. The flexible package of claim 1, wherein the front panel and the rear panel do not contain a metallic layer.

16. The flexible package of claim 1, wherein the at least one polymeric security strip is transparent.

17. The flexible package of claim 1, wherein the at least one polymeric security strip is opaque.

* * * * *